US010618029B2

(12) United States Patent
Goto et al.

(10) Patent No.: US 10,618,029 B2
(45) Date of Patent: Apr. 14, 2020

(54) OXYGEN STORAGE MATERIAL AND METHOD FOR PRODUCING THE SAME

(71) Applicant: TOYOTA JIDOSHA KABUSHIKI KAISHA, Toyota-shi, Aichi (JP)

(72) Inventors: Yoshihiro Goto, Nagakute (JP); Akira Morikawa, Nagakute (JP); Masahide Miura, Toyota (JP); Hiromasa Suzuki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/002,147

(22) Filed: Jun. 7, 2018

(65) Prior Publication Data

US 2018/0353928 A1    Dec. 13, 2018

(30) Foreign Application Priority Data

Jun. 12, 2017    (JP) ................................ 2017-115302

(51) Int. Cl.
*B01J 20/00* (2006.01)
*B01J 20/02* (2006.01)
(Continued)

(52) U.S. Cl.
CPC ..... *B01J 20/0237* (2013.01); *B01J 20/28059* (2013.01); *B01D 53/9445* (2013.01); *B01D 2255/908* (2013.01)

(58) Field of Classification Search
CPC ............ B01J 20/0237; B01J 20/28059; B01D 53/9445; B01D 2255/908
(Continued)

(56) References Cited

U.S. PATENT DOCUMENTS

2003/0166987 A1\*    9/2003    Roark ...................... A62D 3/38
                                                              588/316
2003/0224931 A1    12/2003    Yamamoto et al.
(Continued)

FOREIGN PATENT DOCUMENTS

CN         106492635 A    3/2017
JP         2004-2147 A    1/2004
(Continued)

OTHER PUBLICATIONS

Terribile et al. "Catalytic combustion of hydrocarbons with Mn and Cu-doped ceria±zirconia solid solutions" Catalysis Today 47 (1999) 133±140. (Year: 1999).\*

(Continued)

*Primary Examiner* — Haytham Soliman
(74) *Attorney, Agent, or Firm* — Sughrue Mion, PLLC

(57) ABSTRACT

To provide an oxygen storage material that is capable of exhibiting an excellent oxygen storage capacity (OSC) even at a low temperature of about 300° C. and has a sufficiently high efficiency of use of cerium contained therein.
An oxygen storage material including a ceria-zirconia-copper oxide-based composite oxide that contains cerium, zirconium, and copper, in which
at least part of the copper is solid-dissolved in a composite oxide of the cerium and the zirconium,
the ceria-zirconia-copper oxide-based composite oxide has a composition expressed by the following chemical formula (1):

$$Ce_xZr_yCu_zO_{2-z} \qquad (1)$$

where x, y, and z are numbers each satisfying conditions of x=0.3 to 0.7, y=0.15 to 0.7 (exclusive of y=0.7), z=0 to 0.15 (exclusive of z=0), and x+y+z=1, and
(Continued)

a specific surface area of the ceria-zirconia-copper oxide-based composite oxide is 2 to 50 m$^2$/g.

5 Claims, 2 Drawing Sheets

(51) Int. Cl.
  *B01J 20/28* (2006.01)
  *B01D 53/94* (2006.01)
(58) Field of Classification Search
  USPC ........................................................ 502/400
  See application file for complete search history.

(56) References Cited

U.S. PATENT DOCUMENTS

| | | |
|---|---|---|
| 2015/0255821 A1 | 9/2015 | Lim et al. |
| 2017/0072386 A1 | 3/2017 | Hayashida et al. |
| 2018/0021759 A1 | 1/2018 | Huang et al. |

FOREIGN PATENT DOCUMENTS

| | | |
|---|---|---|
| JP | 2015-170602 A | 9/2015 |
| JP | 2015-182931 A | 10/2015 |
| WO | WO-2015127538 A1 * | 9/2015 |
| WO | 2016127802 A1 | 8/2016 |

OTHER PUBLICATIONS

Aruna et al. "Combustion synthesis and properties of nanostructured ceria-zirconia solid solutions" Nanostructured Materials vol. 10, Issue 6, Aug. 1998, pp. 955-964 (Year: 1998).*

Notice of Reasons for Refusal dated Apr. 12, 2019 from the Japanese Patent Office in application No. 2017-115302.

Notification of Reasons for Refusal dated Oct. 18, 2019 from Japanese Patent Office in counterpart JP Application No. 2017-115302.

* cited by examiner

[FIG. 1]
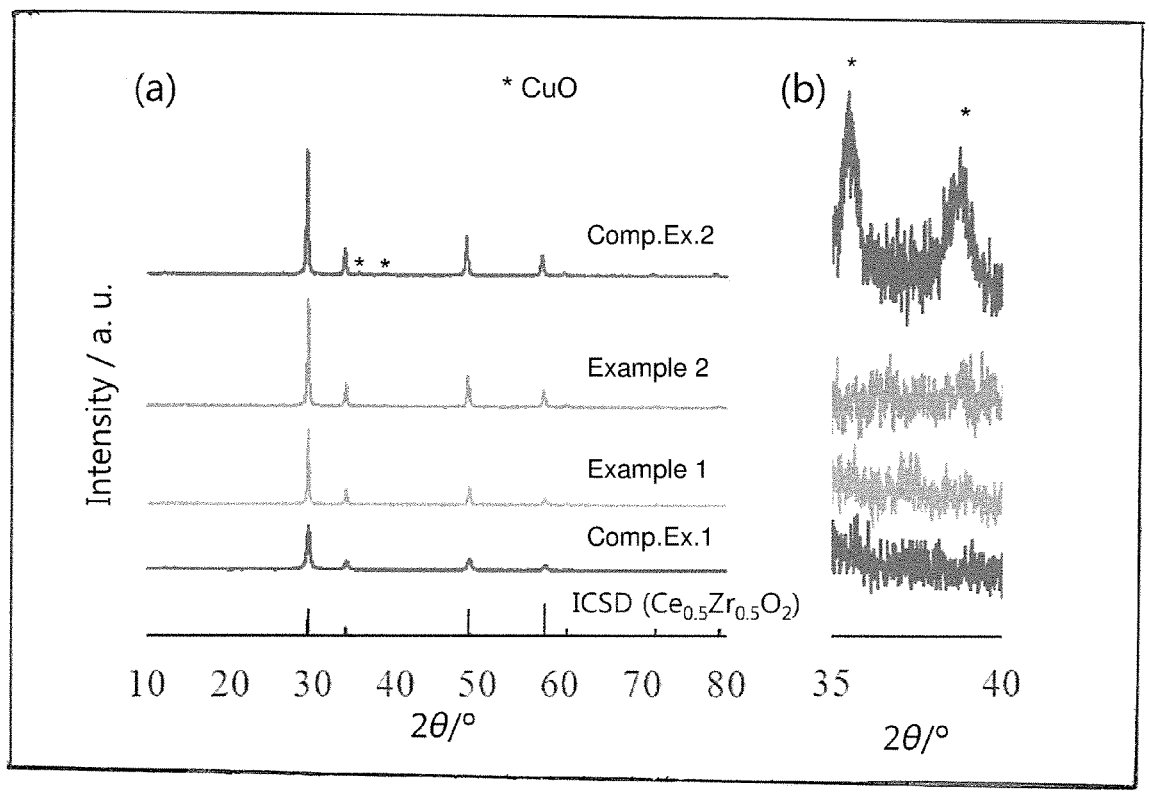
[FIG. 2]
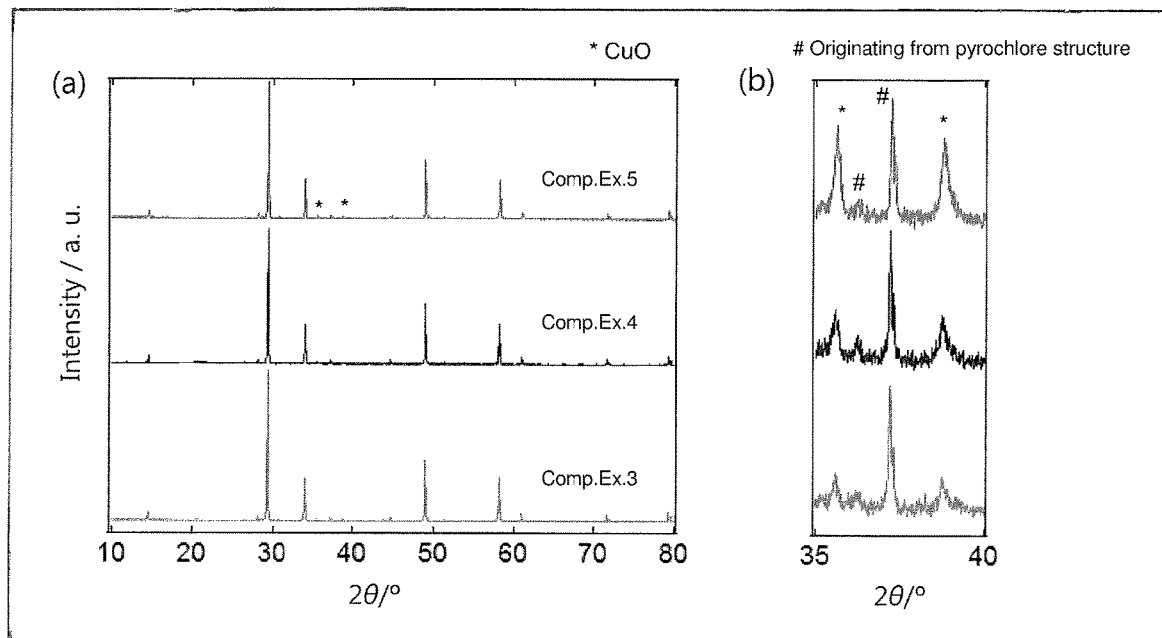

[FIG. 3]
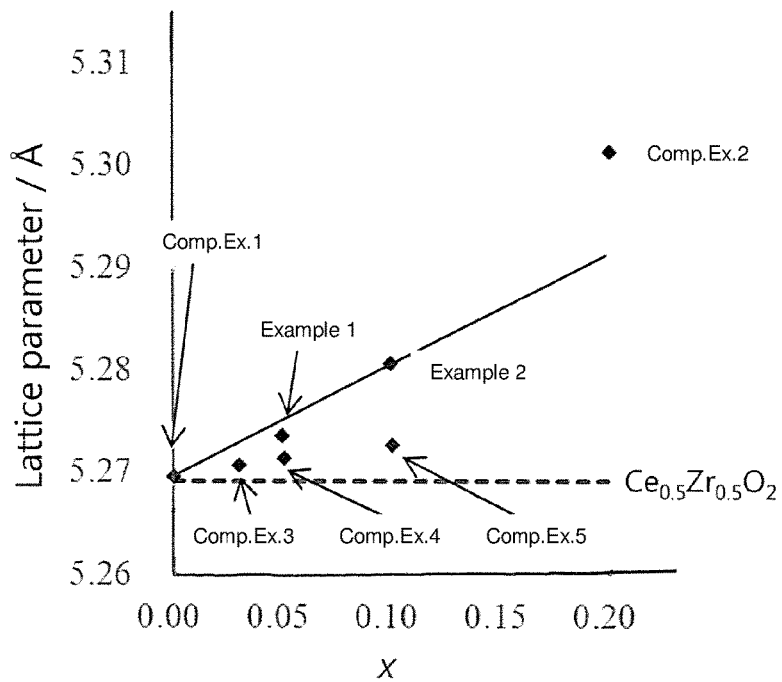
[FIG. 4]
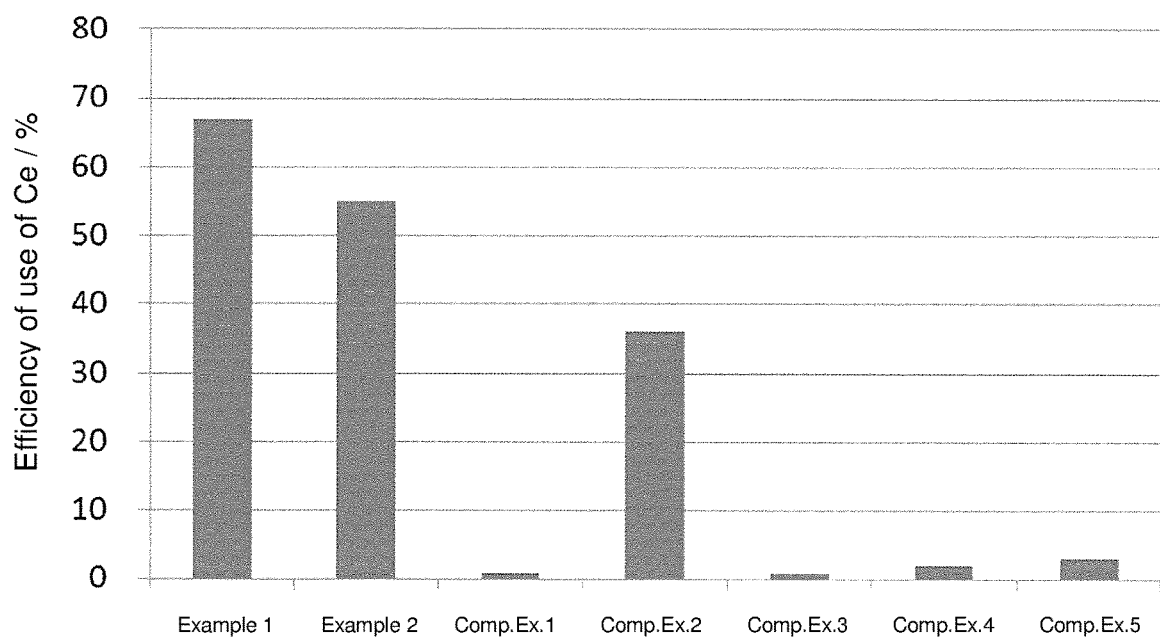

OXYGEN STORAGE MATERIAL AND METHOD FOR PRODUCING THE SAME

BACKGROUND OF THE INVENTION

Field of the Invention

The present invention relates to an oxygen storage material and a method for producing the same.

Related Background Art

A so-called three-way catalyst is known as a catalyst for purification of exhaust gas that is capable of oxidizing carbon monoxide (CO) and hydrocarbon (HC) in exhaust gas emitted from internal combustion engines such as automotive engines and reducing nitrogen oxide (NOx) therein at the same time.

Along with purifying an exhaust gas using a catalyst for purification of exhaust gas, it is known to use, as a support or a promoter for the catalyst for purification of exhaust gas, a material having an oxygen storage capacity (OSC), that is, capable of storing oxygen when the concentration of oxygen in the exhaust gas is high and capable of releasing oxygen when the concentration of oxygen in the exhaust gas is low in order to absorb variations in the concentration of oxygen in the exhaust gas and to thus enhance the exhaust gas purifying capability.

As such an oxygen storage material having OSC, ceria has conventionally been used favorably, and various types of composite oxides containing ceria have recently been studied. Thus, various ceria-zirconia-based composite oxide obtainable through a so-called co-deposited method, reverse co-deposited method, hydrothermal synthesis method, fusion method, and the like have been developed.

For example, Japanese Unexamined Patent Application Publication No. 2015-182931 (JP2015-182931A: Patent Literature 1) discloses a method for producing a ceria-zirconia-based composite oxide through a so-called fusion method, the ceria-zirconia-based composite oxide comprising: cerium; zirconium; and a transition metal element such as iron, manganese, cobalt, nickel, or copper other than cerium and zirconium, and containing a pyrochlore phase as a crystal structure.

However, demands for properties of a catalyst for purification of exhaust gas have recently been increasing, and there has been a demand for an oxygen storage material that is capable of exhibiting an excellent oxygen storage capacity (OSC) even at a low temperature of about 300° C. and has a sufficiently high efficiency of use of cerium contained therein. For this reason, a conventional oxygen storage material as described in Patent Literature 1 has not necessarily been satisfactory.

SUMMARY OF THE INVENTION

The present invention has been made in view of the above-described problems of the conventional techniques, and has an object to provide an oxygen storage material that is capable of exhibiting an excellent oxygen storage capacity (OSC) even at a low temperature of about 300° C. and has a sufficiently high efficiency of use of cerium contained therein, and a method for producing the same.

The present inventors have conducted intensive studies in order to achieve the above-described object, and consequently found the following. First, as a result of selecting and studying copper as an element to be added to a ceria-zirconia-based composite oxide, the present inventors found that it is difficult to solid-dissolve copper into a ceria-zirconia composite oxide by methods such as so-called co-deposited method, reverse co-deposited method, and hydrothermal synthesis method. On the other hand, the present inventors also found that in the case of the fusion method including a high-temperature treatment as described in Patent Literature 1, although the content of the transition metal element to be contained is described as 0.01 to 10 mol % in terms of oxides, the upper limit for the amount of copper capable of being contained in reality is only approximately 1 mol % at most, and also the upper limit for the specific surface area of a composite oxide capable of being obtained is only approximately 1 m²/g at most in reality, and accordingly, in any composite oxide obtained in any method, the oxygen storage capacity (OSC) at a low temperature of about 300° C. is insufficient.

Then, the present inventors have further conducted a number of intensive studies, and consequently found that by selecting copper as an element to be added to a ceria-zirconia-based composite oxide and producing a composite oxide that contains cerium, zirconium, and copper by a so-called solution combustion synthesis method, it becomes possible to cause a sufficient amount of copper to be contained and solid-dissolved into a ceria-zirconia composite oxide, and to further allow the composite oxide obtained to have a sufficiently large specific surface area, enabling an oxygen storage material that is capable of exhibiting an excellent oxygen storage capacity (OSC) even at a low temperature of about 300° C. and has a sufficiently high efficiency of use of cerium contained therein to be obtained. These findings have led to the completion of the present invention.

The oxygen storage material of the present invention is an oxygen storage material comprising a ceria-zirconia-copper oxide-based composite oxide that contains cerium, zirconium, and copper, wherein at least part of the copper is solid-dissolved in a composite oxide of the cerium and the zirconium, the ceria-zirconia-copper oxide-based composite oxide has a composition expressed by the following chemical formula (1):

$$Ce_xZr_yCu_zO_{2-z} \qquad (1)$$

where x, y, and z are numbers each satisfying conditions of x=0.3 to 0.7, y=0.15 to 0.7 (exclusive of y=0.7), z=0 to 0.15 (exclusive of z=0), and x+y+z=1, and a specific surface area of the ceria-zirconia-copper oxide-based composite oxide is 2 to 50 m²/g.

In addition, the method for producing an oxygen storage material of the present invention is a method comprising:

mixing
- at least one cerium compound selected from the group consisting of cerium chloride, cerium nitrate, cerium sulfate, cerium acetate, and cerium oxide,
- at least one zirconium compound selected from the group consisting of zirconium chloride, zirconium nitrate, zirconium sulfate, zirconium acetate, and zirconium oxide,
- at least one copper compound selected from the group consisting of copper chloride, copper nitrate, copper sulfate, copper acetate, and copper oxide, and
- a hydrophilic organic compound in a solvent, to obtain a mixture; and obtaining the above-described oxygen storage material comprising the ceria-zirconia-copper oxide-based composite oxide of the present invention from the mixture through a solution combustion synthesis.

In the oxygen storage material and a method for producing the same according to the present invention, x, y, and z are preferably numbers each satisfying conditions of x=0.3 to 0.7, y=0.15 to 0.67, z=0.03 to 0.15, and x+y+z=1.

In addition, in the oxygen storage material and a method for producing the same according to the present invention, an average crystal size of the ceria-zirconia-copper oxide-based composite oxide is preferably 20 to 100 nm.

Moreover, in the oxygen storage material and a method for producing the same according to the present invention, the ceria-zirconia-copper oxide-based composite oxide preferably has a fluorite structure and more preferably contains no pyrochlore phase.

Further, in the oxygen storage material and a method for producing the same according to the present invention, 90 at % or more of the copper is preferably solid-dissolved in the composite oxide of the cerium and the zirconium.

Furthermore, in the method for producing an oxygen storage material of the present invention, the mixture is preferably obtained by mixing cerium nitrate, zirconium nitrate, copper nitrate, and a hydrophilic organic compound in a solvent.

Note that although it cannot be said to be clear why the oxygen storage material and a method for producing the same according to the present invention as described above can achieve the above-described object, the present inventors surmise as described below. Specifically, in the method for producing an oxygen storage material of the present invention, copper is selected as an element to be added to the ceria-zirconia-based composite oxide and a composite oxide that contains cerium, zirconium, and copper is produced through a so-called solution combustion synthesis method. This makes it possible to allow a sufficient amount of copper to be contained and solid-dissolved into a ceria-zirconia composite oxide, and further makes it possible to obtain a composite oxide having a sufficiently large specific surface area because a high-temperature treatment is not conducted. For these reasons, in the ceria-zirconia-copper oxide-based composite oxide included in the oxygen storage material of the present invention, part of the tetravalent Zr site in a composite oxide of cerium and zirconium is substituted with divalent Cu, so that the bonding strength of adjacent oxygen atoms is weakened. Moreover, the specific surface area is sufficiently large. The present inventors surmise that because of these factors, the oxygen storage material of the present invention becomes capable of exhibiting an excellent oxygen storage capacity (OSC) even at a low temperature of about 300° C., and thus it becomes possible to obtain a oxygen storage material that has a sufficiently high efficiency of use of cerium contained.

The present invention makes it possible to provide an oxygen storage material that is capable of exhibiting an excellent oxygen storage capacity (OSC) even at a low temperature of about 300° C. and has a sufficiently high efficiency of use of cerium contained therein, and a method for producing the same.

BRIEF DESCRIPTION OF THE DRAWINGS

FIG. 1 is a graph showing X-ray diffraction patterns of composite oxides obtained in Examples 1 to 2 and Comparative Examples 1 to 2.

FIG. 2 is a graph showing X-ray diffraction patterns of composite oxides obtained in Comparative Examples 3 to 5.

FIG. 3 is a graph showing results of analyzing lattice constants of the composite oxides obtained in Examples 1 to 2 and Comparative Examples 1 to 5.

FIG. 4 is a graph showing efficiency of use of cerium at 300° C. of the composite oxides obtained in Examples 1 to 2 and Comparative Examples 1 to 5.

DETAILED DESCRIPTION OF THE PREFERRED EMBODIMENTS

Hereinafter, the present invention is described in detail based on preferred embodiments of the present invention.

First, an oxygen storage material of the present invention is described. Specifically, the oxygen storage material of the present invention is an oxygen storage material comprising a ceria-zirconia-copper oxide-based composite oxide that contains cerium, zirconium, and copper, wherein at least part of the copper is solid-dissolved in a composite oxide of the cerium and the zirconium, the ceria-zirconia-copper oxide-based composite oxide has a composition expressed by the following chemical formula (1):

$$Ce_xZr_yCu_zO_{2-z} \qquad (1)$$

where x, y, and z are numbers each satisfying conditions of x=0.3 to 0.7, y=0.15 to 0.7 (exclusive of y=0.7), z=0 to 0.15 (exclusive of z=0), and x+y+z=1, and a specific surface area of the ceria-zirconia-copper oxide-based composite oxide is 2 to 50 m²/g.

The ceria-zirconia-copper oxide-based composite oxide according to the present invention is a composite oxide that contains cerium (Ce), zirconium (Zr), and copper (Cu). It is difficult to solid-dissolve copper into ceria-zirconia composite oxide through a method such as so-called co-deposited method, reverse co-deposited method, or hydrothermal synthesis method even when copper is added to the ceria-zirconia composite oxide. For this reason, the addition of copper does not contribute to an enhancement of the oxygen storage capacity (OSC) at a low temperature. In contrast, the present invention produces a composite oxide that contains cerium, zirconium, and copper through a so-called solution combustion synthesis method as describe below, making it possible to allow a sufficient amount of copper to be contained and solid-dissolved into ceria-zirconia composite oxide, and thus significantly enhances the OSC at a low temperature and the efficiency of use of cerium of the obtained composite oxide. Hence, in the ceria-zirconia-copper oxide-based composite oxide according to the present invention, it is necessary that at least part of the copper be solid-dissolved in a composite oxide of the cerium and the zirconium. Note that it can be confirmed that at least part of the copper is solid-dissolved in a composite oxide of the cerium and the zirconium by checking if the lattice constant is increased by an increase in the amount of copper solid-dissolved in accordance with Vegard's law.

In the oxygen storage material of the present invention, it suffices that at least part of the copper is solid-dissolved in the composite oxide of the cerium and the zirconium. However, it is preferable that 90 at % or more of the copper be solid-dissolved in the composite oxide of the cerium and the zirconium from the viewpoint that the oxygen storage capacity (OSC) at a low temperature and the efficiency of use of cerium are further enhanced and from the viewpoint of more securely preventing copper oxide (CuO) that is not solid-dissolved from being deposited and scattered during its use. It is particularly preferable that 95 at % or more of the copper be solid-dissolved. Note that it can be confirmed that 90 at % or more (particularly preferably, 95 at % or more) of the copper is solid-dissolved in the composite oxide of the cerium and the zirconium as described above, by checking if the presence of peaks corresponding to copper oxide (CuO) that is not solid-dissolved (peaks that appear at 2θ angles of 35.5° and 38.5° in an X-ray diffraction pattern using CuKα) is not observed in an X-ray diffraction (XRD) measurement, which is described later, that is, if the amount of copper oxide (CuO) that is not solid-dissolved is equal to or lower than a detection limit. Note that as such an X-ray diffraction (XRD) measurement, a method including measuring under conditions of 40 KV, 40 mA, and 2θ=5°/min with the CuKα ray using trade name "RINT-Ultima" manufactured by Rigaku Corporation as a measuring device. In addition, the "peak" in a diffraction line refers to one having a height of 30 cps or more from the base line to the peak top.

Such a ceria-zirconia-copper oxide-based composite oxide according to the present invention has a composition expressed by the following chemical formula (1):

$$Ce_xZr_yCu_zO_{2-z} \qquad (1)$$

where x, y, and z are numbers each satisfying conditions of x=0.3 to 0.7, y=0.15 to 0.7 (exclusive of y=0.7), z=0 to 0.15 (exclusive of z=0), and x+y+z=1. If the content of Ce is less than the lower limit, a sufficient OSC is unlikely to be obtained. On the other hand, if the content of Ce is more than the upper limit, the ceria-zirconia-copper oxide composite oxide cannot be obtained as a single phase. In addition, if the content of Zr is less than the lower limit, a sufficient OSC is unlikely to be obtained. On the other hand, if the content of Zr is more than the upper limit, the ceria-zirconia-copper oxide composite oxide cannot be obtained as a single phase. Moreover, if the content of Cu is less than the lower limit, the effects of enhancement of the OSC at a low temperature and the efficiency of use of cerium obtained by the addition of Cu cannot be sufficiently obtained. On the other hand, if the content of Cu is more than the upper limit, the efficiency of use of cerium is decreased and the possibility that copper oxide (CuO) that is not solid-dissolved is deposited and scattered during its use is increased.

In addition, from the same viewpoint, x is more preferably 0.4 to 0.6, y is more preferably 0.15 to 0.67 (particularly preferably 0.3 to 0.5), and z is more preferably 0.03 to 0.15 (particularly preferably 0.05 to 0.1).

Moreover, the present invention produces a composite oxide containing cerium, zirconium, and copper through a so-called solution combustion synthesis method, making it possible to allow a sufficient amount of copper to be contained and solid-dissolved into a ceria-zirconia composite oxide as described above, and making it possible to obtain a composite oxide having a sufficiently large specific surface area. Accordingly, the OSC at a low temperature and the efficiency of use of cerium of the obtained composite oxide are significantly enhanced. Hence, it is necessary that the specific surface area of the ceria-zirconia-copper oxide-based composite oxide according to the present invention be 2 to 50 $m^2/g$. If such specific surface area is less than the lower limit, the effects of enhancement of the OSC at a low temperature and the efficiency of use of cerium cannot be sufficiently obtained. On the other hand, if the specific surface area is more than the upper limit, phase splitting is likely to occur within a temperature range (300 to 600° C.) for measuring the OSC. In addition, from the same viewpoint, it is more preferable that the specific surface area of the ceria-zirconia-copper oxide-based composite oxide according to the present invention be 5 to 20 $m^2/g$. Note that such specific surface area can be calculated as a BET specific surface area from an adsorption isotherm using the BET isotherm adsorption equation, and can be obtained for example by using a commercially-available fully-automatic specific surface area measuring device (MicroSorp MODEL-4232 manufactured by Microdata).

Further, the average crystal size of the ceria-zirconia-copper oxide-based composite oxide according to the present invention is preferably 20 to 100 nm, and more preferably 20 to 80 nm. If such average crystal size is less than the lower limit, phase splitting is likely to occur within a temperature range (300 to 600° C.) for measuring the OSC. On the other hand, if the average crystal size is more than the upper limit, there is a tendency that the effects of enhancement of the OSC and the efficiency of use of cerium cannot be sufficiently obtained. Note that such average crystal size can be calculated using a commercially-available analysis software (for example, Rietveld analysis software "Jana2006"), from an X-ray diffraction pattern which can be obtained using CuKα by an X-ray diffraction measurement.

In addition, in the ceria-zirconia-copper oxide-based composite oxide according to the present invention, the ceria-zirconia-copper oxide-based composite oxide preferably has a fluorite structure. Although a ceria-zirconia-based composite oxide basically has a fluorite structure, in the ceria-zirconia-copper oxide-based composite oxide according to the present invention, part of the tetravalent Zr site is substituted with divalent Cu with such a fluorite structure being maintained, so that the bonding strength of adjacent oxygen atoms is further weakened, and accordingly the oxygen storage capacity (OSC) at a low temperature and the efficiency of use of cerium tend to be further enhanced. Note that the space group of a fluorite structure is generally Fm-3m. Assuming the space group (Fm-3m) of such a fluorite structure, it can be confirmed that the solid-dissolved phase is formed by checking if change in the lattice constant shows linearity.

Moreover, in the ceria-zirconia-copper oxide-based composite oxide according to the present invention, the ceria-zirconia-copper oxide-based composite oxide more preferably contains no pyrochlore phase. If the ceria-zirconia-copper oxide-based composite oxide according to the present invention contains a pyrochlore phase, there is a tendency that the effects of enhancement of the OSC and the efficiency of use of cerium cannot be sufficiently obtained. Note that the space group of the pyrochlore structure is generally Fd-3m, and it can be confirmed that the composite oxide contains no pyrochlore phase by checking if the presence of peaks originating from the pyrochlore structure (peaks that appear at 2θ angles of 36.0° and 37.0° in the X-ray diffraction pattern using CuKα) is not observed in the X-ray diffraction (XRD) measurement (equal to or lower than the detection limit).

In addition, the ceria-zirconia-copper oxide-based composite oxide according to the present invention may further contain at least one element selected from the group consisting of rare earth elements and alkaline earth elements other than cerium. When the ceria-zirconia-copper oxide-based composite oxide according to the present invention contains such an element, the ceria-zirconia-copper oxide-based composite oxide according to the present invention tends to exhibit higher capability of purification of exhaust gas when used as a support for a catalyst for purification of exhaust gas. Such rare earth elements other than cerium include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and lutetium (Lu). Among these, La, Nd, Pr, Y, and Sc are preferable, and La, Y, and Nd are more preferable, from the viewpoint that there is a tendency when a noble metal is supported, these elements strengthen the interaction with the noble metal and enhance the affinity. In addition, the alkaline earth metal elements include magnesium (Mg), calcium (Ca), strontium (Sr), barium (Ba), and radium (Ra). Among these, Mg, Ca, and Ba are preferable from the viewpoint that there is a tendency when a noble metal is supported, these elements strengthen the interaction with the noble metal and enhance the affinity. Since such rare earth elements and alkaline earth metal elements having low electronegativities, other than cerium, have strong interactions with noble metals, there is a tendency that these elements bond to noble metals via oxygen in an oxidation atmosphere and suppress evaporation and sintering of the noble metals, thus sufficiently suppressing degradation of noble metals, which are an active spot in purifying exhaust gas.

Moreover, when the ceria-zirconia-copper oxide-based composite oxide further contains at least one element selected from the group consisting of rare earth elements and alkaline earth elements other than cerium, the content of the element is preferably 1 to 20% by mass, and more preferably 3 to 10% by mass in the ceria-zirconia-copper oxide-based composite oxide. If the content of the element is less than the lower limit, there is a tendency that when a noble metal is supported on the obtained composite oxide, it is difficult to sufficiently enhance the interaction with the noble metal. On the other hand, if the content of the element is more than the upper limit, the oxygen storage capacity tends to decrease.

The oxygen storage material of the present invention comprises the above-described ceria-zirconia-copper oxide-based composite oxide and is capable of exhibiting an excellent oxygen storage capacity (OSC) even at a low temperature of about 300° C. and has a sufficiently high efficiency of use of cerium contained therein. Accordingly, the oxygen storage material of the present invention is capable of being use favorably as a support or a promoter for a catalyst for purification of exhaust gas. Examples of favorable use of such an oxygen storage material of the present invention include a catalyst for purification of exhaust gas including: a support made of the oxygen storage material of the present invention; and a noble metal supported on the support. Such a noble metal includes platinum, rhodium, palladium, osmium, iridium, gold, and silver. In addition, another example of its use is what is obtained by arranging the oxygen storage material of the present invention around a catalyst for purification of exhaust gas in which a noble metal is supported on other catalyst support fine particles.

Next, a method of the present invention for producing the oxygen storage material of the present invention is described.

The method for producing an oxygen storage material of the present invention is a method comprising:
 mixing
  at least one cerium compound selected from the group consisting of cerium chloride, cerium nitrate, cerium sulfate, cerium acetate, and cerium oxide,
  at least one zirconium compound selected from the group consisting of zirconium chloride, zirconium nitrate, zirconium sulfate, zirconium acetate, and zirconium oxide,
  at least one copper compound selected from the group consisting of copper chloride, copper nitrate, copper sulfate, copper acetate, and copper oxide, and
  a hydrophilic organic compound in a solvent, to obtain a mixture; and obtaining an oxygen storage material of the present invention including the ceria-zirconia-copper oxide-based composite oxide from the mixture through solution combustion synthesis. When the target ceria-zirconia-copper oxide-based composite oxide is caused to further contain at least one element selected from the group consisting of rare earth elements and alkaline earth elements other than cerium, a compound of the element (at least one selected from the group consisting of chloride, nitrate, sulfate, acetate, and oxide of the element) may be further added and mixed.

The solution combustion synthesis method employed in the present invention is a kind of liquid-phase oxidation-reduction reaction that uses at least one metal compound selected from the group consisting of chloride, nitrate, sulfate, acetate, oxide of a metal as an oxidant and a hydrophilic organic compound as a reductant (called a "fuel" in the solution combustion synthesis method). Specifically, when raw materials (the oxidant and the fuel) are mixed in a solvent such as water and the obtained mixture (a solution or a gel) is heated, the oxidant and the fuel cause rapid exothermic reaction, and are then combusted at a predetermined temperature as they are, so that a fine powder of the composite oxide of the used metal can be obtained.

In the present invention, at least one cerium compound selected from the group consisting of cerium chloride, cerium nitrate, cerium sulfate, cerium acetate, and cerium oxide, at least one zirconium compound selected from the group consisting of zirconium chloride, zirconium nitrate, zirconium sulfate, zirconium acetate, and zirconium oxide, and at least one copper compound selected from the group consisting of copper chloride, copper nitrate, copper sulfate, copper acetate, and copper oxide are used as oxidants for the solution combustion synthesis method. In addition, in the present invention, cerium nitrate, zirconium nitrate, and copper nitrate are preferably used as oxidants for the solution combustion synthesis method. As such cerium nitrate, although not particularly limited, $Ce(NH_4)_2(NO_3)_6$ is preferable for example. In addition, as the zirconium nitrate, although not particularly limited, $ZrO(NO_3)_2 \cdot 2H_2O$ is preferable for example. Moreover, as the copper nitrate, although not particularly limited, $Cu(NO_3)_2 \cdot 3H_2O$ is preferable for example.

In addition, as the hydrophilic organic compound used as a reductant (fuel) in the solution combustion synthesis method, although not particularly limited, glycine, glucose, urea, alanine, oxalyl hydrazine, and the like are preferable. Further, as the solvent in the solution combustion synthesis method, although water is favorably used in general, the solvent may be an aqueous solution containing nitric acid ions or a hydrophilic organic solvent such as ethanol.

In the method for producing an oxygen storage material of the present invention, the oxidant and the reductant (fuel) are first mixed in the solvent. At this time, it is preferable to mix the metal compounds (cerium compound, zirconium compound, and copper compound), which are used as oxidants, such that the metal atoms satisfy the stoichiometric ratio in accordance with the composition (target composition) of the target ceria-zirconia-copper oxide-based composite oxide.

In addition, what is important in the solution combustion synthesis method is the ratio between an oxidant and a reductant (fuel). In general, one indication is the molar ratio between an oxidant and a reductant (fuel) ([oxidant]/[reductant]) in a stoichiometry assuming that the oxidant is reduced to be a metal or a metal oxide and the fuel is oxidized and $CO_2$ and $H_2O$ are also reduced. This stoichiometric molar ratio varies depending on the kinds of an oxidant and a reductant to be use. It is preferable to mix an oxidant and a reductant such that the molar ratio between raw materials supplied for the solution combustion synthesis (the molar ratio between the oxidant and the reductant (fuel), which are involved in the oxidation-reduction reaction ([oxidant]/[reductant]) comes close to the stoichiometric molar ratio. However, it is also possible to cause the reaction with an excess of the reductant (fuel), and to remove unreacted substances during combustion reaction.

Moreover, although not particularly limited, the amount of the solvent in which to mix the oxidant and the reductant (fuel) may be any amount equal to or more than a minimum amount that allows the oxidant and the reductant to be dissolved, and is preferably close to the minimum amount (approximately, 1 to 2 times the minimum amount).

Next, in the method for producing an oxygen storage material of the present invention, the oxygen storage material of the present invention comprising the ceria-zirconia-copper oxide-based composite oxide can be obtained by conducting synthesis through direct combustion reaction without sedimentation from a mixture obtained by mixing the oxidant and the reductant (fuel) in the solvent. At this time, the mixture used for the combustion reaction is preferably a solution in which the used oxidant and reductant are dissolved in the solvent, but may be a gel generated by an intermediate product of the oxidation-reduction reaction. In addition, although not particularly limited, the temperature and time of the combustion reaction are preferably for approximately 1 to 5 hours within a temperature range of 200 to 600° C. Moreover, the atmosphere for the combustion reaction is not particularly limited and may be the ambient atmosphere, but may also be an inert atmosphere such as argon, nitrogen, or helium.

EXAMPLES

Hereinafter, the present invention is described in further detail based on Examples and Comparative Examples; however, the present invention is not limited to the following Examples.

The following reagents were used.
(1) Cerium nitrate: $Ce(NH_4)_2(NO_3)_6$ (purity: 99.5%, manufactured by Wako Pure Chemical Industries, Ltd.)
(2) Zirconium nitrate: $ZrO(NO_3)_2 \cdot 2H_2O$ (purity: 97%, manufactured by Wako Pure Chemical Industries, Ltd.)
(3) Copper nitrate: $Cu(NO_3)_2 \cdot 3H_2O$ (purity: 99%, Wako Pure Chemical Industries, Ltd.)
(4) Hydrophilic organic compound: glycine ($C_2H_5NO_2$) (purity: 99%, manufactured by Wako Pure Chemical Industries, Ltd.)

Example 1

The target composition was set to $Ce_{0.5}Zr_{0.45}Cu_{0.05}O_{1.95}$, and a ceria-zirconia-copper oxide composite oxide having the above-described composition was obtained through the solution combustion synthesis method as described below.

Specifically, cerium nitrate, zirconium nitrate, and copper nitrate in a stoichiometric ratio were dissolved in amounts of charge shown in Table 1 into the minimum amount of pure water shown in Table 1 at ordinary temperature so as to obtain the target composition. After it was confirmed that the solution became transparent, glycine in an amount corresponding to two equivalents with respect to the total amount of cations and shown in Table 1 was dissolved to obtain a mixed solution (solution). Next, the obtained mixed solution was put into an alumina crucible, followed by firing at 400° C. for 2 hours in the ambient atmosphere in a degreasing furnace to obtain a powder of a ceria-zirconia-copper oxide composite oxide having the above-described composition. The obtained powder had an average crystal size of about 50 nm and an average particle size of about 5 μm.

Example 2

The target composition was set to $Ce_{0.5}Zr_{0.4}Cu_{0.1}O_{1.9}$, and a powder of a ceria-zirconia-copper oxide composite oxide having the above-described composition was obtained in the same manner as in Example 1 except that the amount of each reagent was changed to an amount shown in Table 1.

Comparative Example 1

The target composition was set to $Ce_{0.5}Zr_{0.5}O_2$, and a powder of a ceria-zirconia composite oxide having the above-described composition was obtained in the same manner as in Example 1 except that the amount of each reagent was changed to an amount shown in Table 1.

Comparative Example 2

The target composition was set to $Ce_{0.5}Zr_{0.3}Cu_{0.2}O_{1.8}$, and a powder of a ceria-zirconia-copper oxide composite oxide having the above-described composition was obtained in the same manner as in Example 1 except that the amount of each reagent was changed to an amount shown in Table 1.

TABLE 1

| Reagent | Example 1 | Example 2 | Comparative Example 1 | Comparative Example 2 | |
|---|---|---|---|---|---|
| $(NH_4)_2Ce(NO_3)_6$ | 5.0000 | 5.0000 | 5.0000 | 5.0000 | g |
| $ZrO(NO_3)_2 \cdot 2H_2O$ | 2.1938 | 1.9500 | 2.4375 | 1.4625 | g |
| $Cu(NO_3)_2 \cdot 3H_2O$ | 0.2203 | 0.4407 | 0 | 0.8814 | g |
| $C_2H_5NO_2$ (Glycine) | 2.7385 | 2.7385 | 2.7385 | 2.7385 | g |
| $H_2O$ | 13.0 | 13.0 | 13.0 | 13.0 | ml |

Comparative Example 3

The target composition was set to $Ce_{0.5}Zr_{0.475}Cu_{0.025}O_{1.975}$, and a ceria-zirconia-copper oxide composite oxide having the above-described composition was obtained through a method combining a reverse co-deposited method and a high-temperature reduction treatment (a high-temperature treatment similar to a fusion method) as described below.

Specifically, 15 g of a $H_2O_2$ aqueous solution was mixed into a mixed solution of 50 g of a 28.0% by mass aqueous solution of $Ce(NO_3)_3$ and 77 g of a 18.0% by mass aqueous solution of $Zr(NO_3)_4$ so that $Ce^3$ was oxidized to $Ce^{4+}$. Thereafter, the resultant mixture was added to 57 g of a 25.0% by mass aqueous solution of $NH_3$ to form a gel. Subsequently, a dispersion containing the gel was put into a glass beaker, followed by calcining at 150° C. for 7 hours in the ambient atmosphere in a degreasing furnace and then firing at 400° C. for 5 hours in the ambient atmosphere to obtain a powder of a ceria-zirconia composite oxide.

Next, Cu was supported on 10 g of the obtained powder of the ceria-zirconia composite oxide to obtain the above-described target composition by using 32 g of a 1.0% by mass aqueous solution of $Cu(NO_3)_2$, which was then dried, followed by firing at 500° C. for 5 hours in the ambient atmosphere to obtain a precursor powder of a ceria-zirconia-copper oxide composite oxide. Then, the obtained precursor powder was pressure-molded with a pressure of 3 ton for 1 minute into a compact having a size of 50 mm×50 mm×5 mm, which was then subjected to reduction treatment at 1700° C. for 5 hours in a crucible filled with active carbon, further followed by firing at 500° C. for 5 hours in the ambient atmosphere and pulverizing into a powder having an average particle size of about 75 μm to obtain a powder of a ceria-zirconia-copper oxide composite oxide.

Comparative Example 4

Except that the target composition was changed to $Ce_{0.5}Zr_{0.45}Cu_{0.05}O_{1.95}$, a powder of a ceria-zirconia-copper oxide composite oxide having the above-described composition was obtained in the same manner as in Comparative Example 3.

Comparative Example 5

Except that the target composition was changed to $Ce_{0.5}Zr_{0.4}Cu_{0.1}O_{1.9}$, a powder of a ceria-zirconia-copper oxide composite oxide having the above-described composition was obtained in the same manner as in Comparative Example 3.

<X-Ray Diffraction (XRD) Measurement>

The crystal phases of the composite oxides obtained in Examples and Comparative Examples were measured by a X-ray diffraction method. Note that the X-ray diffraction patterns were measured under conditions of 40 KV, 40 mA, and 2θ=5°/min with the CuKα ray using trade name "RINT-Ultima" manufactured by Rigaku Corporation as the X-ray diffraction device.

The X-ray diffraction patterns thus obtained are shown in FIG. 1 and FIG. 2. In FIG. 1 and FIG. 2, (a) shows the XRD patterns of the entire angle and (b) shows the patterns of 2θ=35 to 40°. FIG. 1 also shows the XRD pattern of the entire angle of $Ce_{0.5}Zr_{0.5}O_2$ in the Inorganic Crystal Structure Database (ICSD).

In addition, the lattice constant (lattice parameter) was analyzed and the average crystal size (crystal size) was calculated from each obtained X-ray diffraction pattern using the Rietveld analysis software "Jana2006", and the results thus obtained are shown in Table 2 and FIG. 3. Note that FIG. 3 shows lattice constants in the case of Fm-3m where the space group was fluorite structure, and the numbers in parentheses in the column of lattice constant in Table 2 are standard errors.

<Measurement of Specific Surface Area>

The specific surface area (SSA) was measured for each of the composite oxides obtained in Examples and Comparative Examples through a single point BET method using a fully-automatic specific surface area measuring device (MicroSorp MODEL-4232 manufactured by Microdata), and the results thus obtained are shown in Table 2.

TABLE 2

| | Lattice parameter/Å | Crystal size/nm | $SSA/m^2g^{-1}$ |
|---|---|---|---|
| Example 1 | 5.2729(3) | 62.26 | 7.95 |
| Example 2 | 5.2805(2) | 58.56 | 6.77 |
| Comparative Example 1 | 5.2694(5) | 25.30 | 17.16 |
| Comparative Example 2 | 5.30117(7) | 60.53 | 9.28 |
| Comparative Example 3 | 5.2714(1) | 218.7 | 0.16 |
| Comparative Example 4 | 5.2720(1) | 231.4 | 0.17 |
| Comparative Example 5 | 5.2727(1) | 204.4 | 0.15 |

<Measurement of Oxygen Storage Capacity (OSC)>

The oxygen storage capacity was measured for each of the composite oxides obtained in Examples and Comparative Examples as described below. Specifically, a thermogravimeter "TGA-50" (manufactured by Shimadzu Corporation) was used as a measuring device, and a lean gas ($O_2$ (10% by volume)+$N_2$ (balance)) and a rich gas ($H_2$ (10% by volume)+$N_2$ (balance)) were alternately switched every 5 minutes to be caused to flow through 0.030 g of the composite oxide obtained in each of Examples and Comparative Examples under a condition of 300° C. and the oxygen storage capacity was obtained from an average of the values of increase in mass of the composite oxide measured three times. Moreover, the efficiency of use of cerium (%) was calculated from the ratio of the actual value of the OSC to the theoretical value of the OSC based on the amount of cerium contained in the composite oxide. The results thus obtained are shown in Table 3 and FIG. 4.

TABLE 3

| | OSC Amount [mmol/g] at 300° C. | Efficiency of Use of Ce [%] at 300° C. |
|---|---|---|
| Example 1 | 0.75 | 67 |
| Example 2 | 0.83 | 55 |
| Comp. Ex. 1 | 0.01 | 1.2 |
| Comp. Ex. 2 | 1.04 | 36 |
| Comp. Ex. 3 | 0.01 | 0.8 |
| Comp. Ex. 4 | 0.38 | 2.0 |
| Comp. Ex. 5 | 0.60 | 2.8 |

<Result of Evaluation of Composite Oxide>

As is clear from the results shown in FIG. 1 and FIG. 3, the ceria-zirconia-copper oxide composite oxide of the present invention obtained in each of Examples 1 to 2 through the production method of the present invention was obtained as a single phase, and had a fluorite structure with a space group of Fm-3m as in the case of the ceria-zirconia composite oxide obtained in Comparative Example 1, and also it was acknowledged that the ceria-zirconia-copper oxide composite oxide contained no pyrochlore phase from the fact that the presence of peaks originating from the pyrochlore structure (peaks that appear at 2θ angles of 36.0° and 37.0° in the X-ray diffraction pattern using CuKα) was not observed in the X-ray diffraction (XRD) measurement. Moreover, in the ceria-zirconia-copper oxide composite oxide of the present invention obtained in each of Examples 1 to 2, the lattice constant was increased along with increase in the amount of copper solid-dissolved in accordance with Vegard's law. From this fact, it was acknowledged that the ceria-zirconia-copper oxide composite oxides were in the state where copper was solid-dissolved in the ceria-zirconia composite oxide. Moreover, from the fact that the presence of peaks corresponding to copper oxide (CuO) (peaks that appear at 2θ angles of 35.5° and 38.5° in the X-ray diffraction pattern using CuKα) was not observed in the X-ray diffraction (XRD) measurement, it was acknowledged that 90 at % or more of copper was solid-dissolved in the ceria-zirconia composite oxide. Furthermore, as is clear from the results shown in Tables 2 to 3 and FIG. 4, in the ceria-zirconia-copper oxide composite oxide of the present invention obtained in each of Examples 1 to 2, the specific surface area was 2 to 50 m²/g and the average crystal size was 20 to 100 nm, and it was acknowledge that the ceria-zirconia-copper oxide composite oxide was an oxygen storage material that is capable of exhibiting an excellent oxygen storage capacity (OSC) even at a low temperature of 300° C. and has a sufficient high efficiency of use of cerium contained therein.

In contrast, it was acknowledged that in the ceria-zirconia composite oxide which was obtained in Comparative Example 1 and which did not contain copper, the oxygen storage capacity at a low temperature and the efficiency of use of cerium were both very low.

In addition, in the ceria-zirconia-copper oxide composite oxide which was obtained in Comparative Example 2 and which had a content of copper out of the range of the present invention, the lattice constant was deviated from Vegard's law and the presence of peaks corresponding to copper oxide were observed in the X-ray diffraction measurement. From this, the presence of copper oxide that was not solid-dissolved in the ceria-zirconia composite oxide was acknowledged, and the efficiency of use of cerium was acknowledged to be inferior to that of the ceria-zirconia-copper oxide composite oxide of the present invention obtained in each of Examples 1 to 2.

Moreover, in the ceria-zirconia-copper oxide composite oxides obtained in Comparative Examples 3 to 5 through the method combining the reverse co-deposited method and the high-temperature reduction treatment (a high-temperature treatment similar to a fusion method), the presence of peaks originating from the pyrochlore structure and peaks corresponding to copper oxide were observed in the X-ray diffraction measurement. From this, it was acknowledged that the ceria-zirconia-copper oxide composite oxides contained the pyrochlore phase and that copper oxide that was not solid-dissolved in the ceria-zirconia composite oxide was present. In addition, in the ceria-zirconia-copper oxide composite oxides obtained in Comparative Examples 3 to 5, both of the specific surface area and the average crystal size were out of the ranges of the present invention, and it was acknowledged that both of the oxygen storage capacity at a low temperature and the efficiency of use of cerium were low.

As described above, the present invention makes it possible to provide an oxygen storage material that is capable of exhibiting an excellent oxygen storage capacity (OSC) even at a low temperature of about 300° C. and has a sufficiently high efficiency of use of cerium contained therein, and a method for producing the same.

The oxygen storage material of the present invention obtained through the production method of the present invention is thus capable of being favorably utilized as a support, a promoter, a catalyst atmosphere adjuster, and the like for a catalyst for purification of exhaust gas.

What is claimed is:

1. A method for producing an oxygen storage material, comprising:
   mixing
      at least one cerium compound selected from the group consisting of cerium chloride, cerium nitrate, cerium sulfate, cerium acetate, and cerium oxide,
      at least one zirconium compound selected from the group consisting of zirconium chloride, zirconium nitrate, zirconium sulfate, zirconium acetate, and zirconium oxide,
      at least one copper compound selected from the group consisting of copper chloride, copper nitrate, copper sulfate, copper acetate, and copper oxide, and
      a hydrophilic organic compound in a solvent, to obtain a mixture, said hydrophilic organic compound being selected from the group consisting of glycine, glucose, urea, alanine and oxalyl hydrazine; and
   obtaining the oxygen storage material comprising a ceria-zirconia-copper oxide-based composite oxide from the mixture through a solution combustion synthesis,
   said ceria-zirconia-copper oxide-based composite oxide being that containing cerium, zirconium and copper,
   wherein 90 at % or more of the copper is solid-dissolved in a composite oxide of the cerium and the zirconium,
   the ceria-zirconia-copper oxide-based composite oxide has a composition expressed by the following chemical formula (1):

$$Ce_xZr_yCu_zO_{2-z} \qquad (1)$$

where x, y, and z are numbers each satisfying conditions of x=0.3 to 0.7, y=0.15 to 0.7 (exclusive of y=0.7), z=0 to 0.15 (exclusive of z=0), and x+y+z=1, and
   a specific surface area of the ceria-zirconia-copper oxide-based composite oxide is 2 to 50 m²/g.

2. The method for producing an oxygen storage material according to claim 1, wherein
   the mixture is obtained by mixing cerium nitrate, zirconium nitrate, copper nitrate, and the hydrophilic organic compound in a solvent.

3. The method for producing an oxygen storage material according to claim 1, wherein x, y, and z are numbers each satisfying conditions of x=0.3 to 0.7, y=0.15 to 0.67, z=0.03 to 0.15, and x+y+z=1.

4. The method for producing an oxygen storage material according to claim 1, wherein
   an average crystal size of the ceria-zirconia-copper oxide-based composite oxide is 20 to 100 nm.

5. The method for producing an oxygen storage material according to claim 1, wherein
   the ceria-zirconia-copper oxide-based composite oxide has a fluorite structure and contains no pyrochlore phase.

* * * * *